(12) United States Patent
Nam

(10) Patent No.: US 6,714,349 B2
(45) Date of Patent: Mar. 30, 2004

(54) SCREEN AND PROJECTION DISPLAY SYSTEM WITH IMPROVED VIEWING ANGLE CHARACTERISTIC

(75) Inventor: Hui Nam, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 33 days.

(21) Appl. No.: 10/108,057

(22) Filed: Mar. 25, 2002

(65) Prior Publication Data

US 2002/0141055 A1 Oct. 3, 2002

(30) Foreign Application Priority Data

Mar. 27, 2001 (KR) ........................................ 2001-15953

(51) Int. Cl.⁷ .................. G03B 21/60; G02B 27/10; G02B 3/08
(52) U.S. Cl. ................. 359/457; 359/458; 359/626; 359/741
(58) Field of Search ................. 359/454–458, 359/463, 619, 625–626, 741–743; 345/6; 353/7, 32

(56) References Cited

U.S. PATENT DOCUMENTS

| | | | |
|---|---|---|---|
| 2,258,164 A | * 10/1941 | de Lassus Saint Genies | 359/458 |
| 3,578,841 A | * 5/1971 | Elmer | 359/457 |
| 4,111,695 A | * 9/1978 | Yevick | 359/463 |
| 4,927,233 A | * 5/1990 | Nakanishi et al. | 359/456 |
| 4,941,732 A | * 7/1990 | Umeda et al. | 359/456 |
| 5,606,455 A | * 2/1997 | Eichenlaub | 359/463 |
| 5,703,606 A | 12/1997 | Blundell | |
| 6,097,539 A | 8/2000 | Clausen | |
| 6,130,777 A | 10/2000 | Yamashita et al. | |
| 6,414,794 B1 | * 7/2002 | Rosenthal | 359/626 |

* cited by examiner

Primary Examiner—Christopher Mahoney
(74) Attorney, Agent, or Firm—Christie, Parker & Hale, LLP

(57) ABSTRACT

A screen for a projection display system. The screen has a Fresnel lens for converting incoming light into parallel light and a Lenticular lens disposed on a surface of the Fresnel lens to change a path of the parallel light from the Fresnel lens, providing a three-dimensional image to a user. The Lenticular lens includes plural pixel lenses corresponding to pixels of the screen. Each of the pixel lenses has a central diffusing portion formed on a light-outgoing portion and a peripheral diffusing portion formed on a peripheral portion of the central diffusing portion.

13 Claims, 3 Drawing Sheets

SCREEN AND PROJECTION DISPLAY SYSTEM WITH IMPROVED VIEWING ANGLE CHARACTERISTIC

CROSS-REFERENCE TO RELATED APPLICATIONS

This application claims priority of Korean Application No. 2001-15953, filed on Mar. 27, 2001 in the Korean Patent Office, the entire disclosure of which is incorporated herein by reference.

FIELD OF THE INVENTION

The present invention relates to a projection display system and, more particularly, to a screen with an improved viewing angle characteristic and a projection display system for realizing a projection image using the screen.

BACKGROUND OF THE INVENTION

Projection display systems, such as projection televisions and video projectors, have an image display device, such as a specially manufactured small-sized cathode ray tube (CRT), a liquid crystal display (LCD), or a polymer dispersed liquid crystal (PDLC), for generating the image. The generated image is enlarged and projected to a large-sized screen by a projection lens so that the final image transmitted to a user can be easily seen. Projection display systems which provide such enlarged images to the user are increasingly becoming in great demand.

Such a projection display system includes a light source for generating white light, a shutter for allowing light to come through in response to an image signal, a lens for enlarging and projecting the image light coming through the shutter, and a screen on which the image light that is enlarged and projected by the projection lens is displayed.

The screen includes a Fresnel lens for converting the image light from the projection lens into parallel light so as to display the image with a uniform brightness throughout the whole area of the screen, a Lenticular lens for diffusing the parallel light from the Fresnel lens, and a protecting panel for protecting the Lenticular lens.

A light-incoming surface of the Lenticular lens is provided with plural cylindrical convex lenses, and a light-outgoing surface of the Lenticular lens is provided with plural convex lenses and a light absorption layer.

However, to satisfactorily provide good display quality to a plurality of users watching the screen of the projection display system, particularly when the users are widely dispersed in the horizontal direction with respect to the screen, the screen must provide a wide viewing angle in the horizontal direction.

To widen the viewing angle of the screen in the horizontal direction, U.S. Pat. No. 6,130,777 discloses a projection screen having a Lenticular lens sheet provided at its light-outgoing surface with a plastic film having orderly arranged minute ridges.

In addition, U.S. Pat. No. 6,097,539 discloses a projection screen having a Lenticular lens provided at its light-outgoing surface with two asymmetric total reflecting lenses arranged in the lengthwise direction.

In recent years, a three-dimensional projection display system has been developed. U.S. Pat. No. 5,703,606 discloses such a three-dimensional projection display system realizing the three-dimensional image by rotating the screen at a predetermined speed. For the user to watch the three-dimensional image, the screen should provide the viewing angle of about 180° in horizontal and vertical directions of the screen.

However, the above-described screens for the projection display systems are not designed to provide a sufficient viewing angle in the vertical direction. Therefore, such screens cannot be employed in the three-dimensional projection display system.

Accordingly, to obtain a sufficient viewing angle in the vertical direction of the screen, an optical diffusing agent is added in the Lenticular lens to enlarge the viewing angle in the vertical direction of the screen. However, the light becomes excessively diffused and reflected rearward, deteriorating the contrast of the image.

Therefore, the present invention has been made in an effort to solve the above described-problems.

SUMMARY OF THE INVENTION

In accordance with the present invention, a screen for a projection display system is provided that can sufficiently provide horizontal and vertical viewing angles, thereby improving the viewing angle characteristic while maintaining a good contrast characteristic.

Further in accordance with the present invention, a projection display system using such a screen is also provided.

The screen for the projection display system includes a Fresnel lens for converting incoming light into parallel light. A Lenticular lens is disposed on a surface of the Fresnel lens to change a path of the parallel light from the Fresnel lens, providing a three-dimensional image to a user. The Lenticular lens includes a plurality of pixel lenses corresponding to pixels of the screen. Each of the pixel lenses has a central diffusing portion formed on a light-outgoing portion and a peripheral diffusing portion formed on a peripheral portion of the central diffusing portion. A sectional shape of the pixel lenses with respect to horizontal and vertical directions of the screen may be made radially symmetrical. The central diffusing portion may be formed in a hemispherical shape and the peripheral diffusing portion may be formed as a wing enclosing the central diffusing portion. A distance between a first top of the peripheral diffusing portion and a light-incoming portion of the Lenticular lens may be made greater than a distance between a second top of the central diffusing portion and the light-incoming portion of the Lenticular lens. The first top of the peripheral diffusing portion may be such that when an angle between a line normal to the first top and a path of the parallel light coming in to the first top is α, the angle α becomes 45°. The pixel lenses may be formed of a material having a refractive index more than $\sqrt{2}$.

According to another aspect of the present invention, a projection display system includes a projector for generating an image and a screen for converting the image from the projector into a three-dimensional image. The screen includes a Fresnel lens for converting incoming light into parallel light and a Lenticular lens disposed on a surface of the Fresnel lens to change a path of the parallel light from the Fresnel lens and to provide a three-dimensional image to a user. The Lenticular lens includes a plurality of pixel lenses corresponding to pixels of the screen. Each of the pixel lenses includes a central diffusing portion formed on a light-outgoing portion and a peripheral diffusing portion formed on a peripheral portion of the central diffusing portion. The screen may be rotatable by a motor. The projection display system may further include an optical shutter for adjusting a light transmission rate in response to an image signal, the shutter being disposed between the Fresnel lens and the Lenticular lens. The optical shutter may be formed of an FLCD (Ferroelectric Liquid Crystal Display).

BRIEF DESCRIPTION OF THE DRAWINGS

An embodiment of the present invention will be described in more detail with reference to the accompanying drawings, wherein.

DETAILED DESCRIPTION OF THE INVENTION

Figure 1:
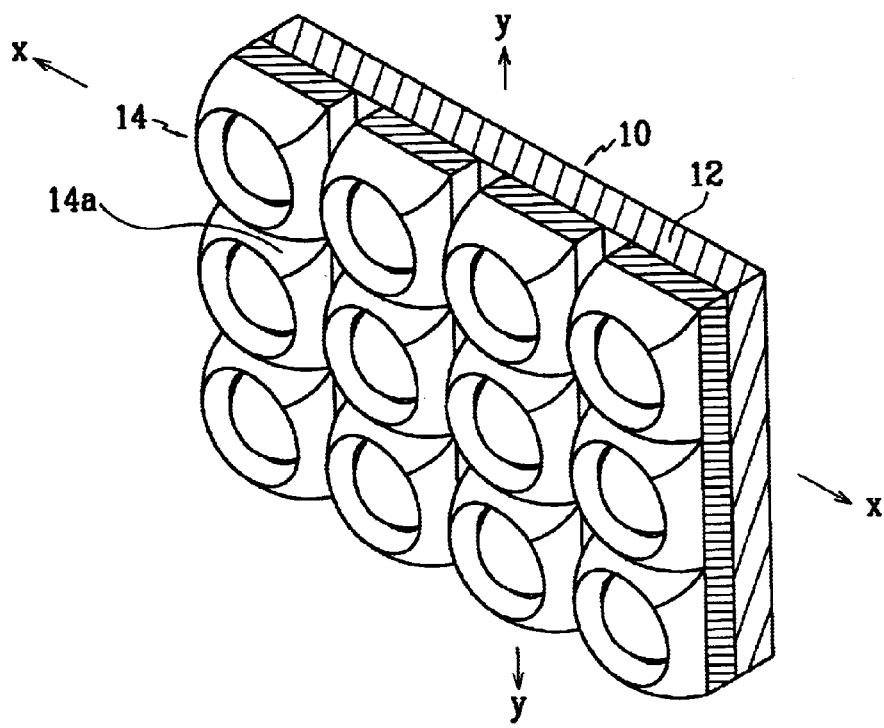
FIG. 1 is a perspective view of a screen of a projection display system according to an embodiment of the present invention.

FIG. 1 shows a screen for a projection display system according to an embodiment of the present invention, in which arrows X and Y respectively indicate horizontal and vertical directions of screen 10.

Referring to FIG. 1, screen 10 includes Fresnel lens 12 for converting incoming light from a projection lens (not shown) into parallel light, and Lenticular lens 14 for changing a projection path of the light from Fresnel lens 12 so that a user can perceive a three-dimensional image. A protecting panel (not shown) is disposed on a light-outgoing surface of Lenticular lens 14.

According to a feature of the invention, the Lenticular lens includes a plurality of pixel lenses 14a corresponding to pixels of screen 10 so as to provide a widened viewing angle (180° in the horizontal and vertical directions) to the screen.

Each pattern of pixel lenses 14a may be designed to be identical to that of the pixels of the screen. In this embodiment, pixel lens 14a is formed in a stripe pattern having a longitudinal axis in the vertical direction Y.

Figure 2:
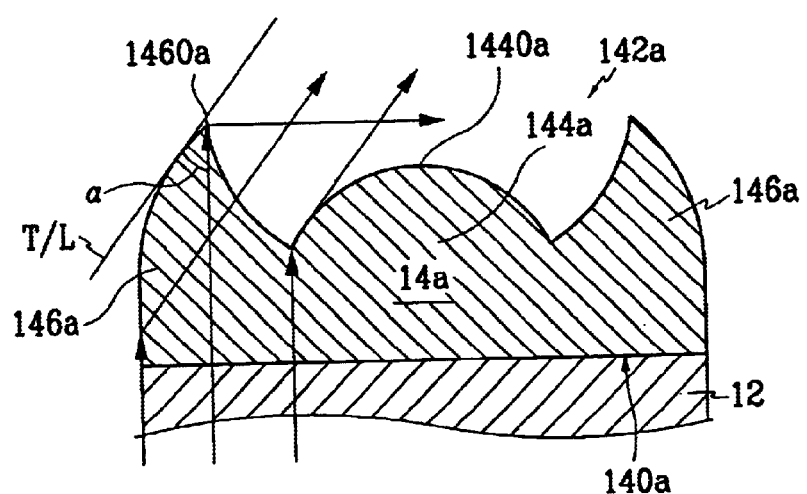
FIG. 2 is a sectional view illustrating a pixel lens of a screen for a projection display system according to an embodiment of the present invention.

As shown in FIG. 2, each of the pixel lenses 14a includes light-incoming portion 140a for receiving the light from Fresnel lens 12, and light-outgoing portion 142a for radiating the light coming to light-incoming portion 140a. In this embodiment, light-incoming portion 140a facing Fresnel lens 12 is designed to be flat.

The light-outgoing portion 142a is divided into central-diffusing portion 144a and peripheral-diffusing portion 146a. Central-diffusing portion 144a is formed in a hemispherical shape that can diffuse the incoming light of a central portion of pixel lens 14a in both the horizontal and vertical directions. Peripheral-diffusing portion 146a is formed in a wing shape, enclosing central diffusing portion 144a so as to diffuse the incoming light of a peripheral portion of the pixel lens in both the vertical and horizontal directions. That is, pixel lens 14a has a shape similar to a crater of a volcano when it is viewed with reference to FIG. 1 and a shape similar to a bat with spread wings when it is viewed with reference to FIG. 2. In other words, the sectional view of pixel lens 14a is radially symmetrical in the horizontal and vertical directions X and Y. Pixel lenses 14a may be formed of a material having a refractive index of more than $\sqrt{2}$ such as acrylic, vinyl, and polycarbonate.

Further, the distance between top 1460a of peripheral diffusing portion 146a and the light-incoming portion of Lenticular lens 14 is made greater than the distance between top 1440a of central diffusing portion 144a and the light-incoming portion of Lenticular lens 14.

Top 1460a of peripheral diffusing portion 146a is designed such that when an angle between a line T/L that is normal to top 1460a and a path of the parallel incoming light to top 1460a is α, the angle α becomes 45° at the point where the part of incoming light having an angle above a critical angle can be totally reflected at light-outgoing portion of 142a of pixel lens 14a.

In operation, when an image light comes from a projector to the light-incoming portion of screen 10, the incoming light is totally diffused in the horizontal and vertical directions as it passes through pixel lenses 14a of Lenticular lens 14 as shown in FIG. 2, thereby providing the three-dimensional image having a sufficient viewing angle in the horizontal and vertical directions.

Figure 3:
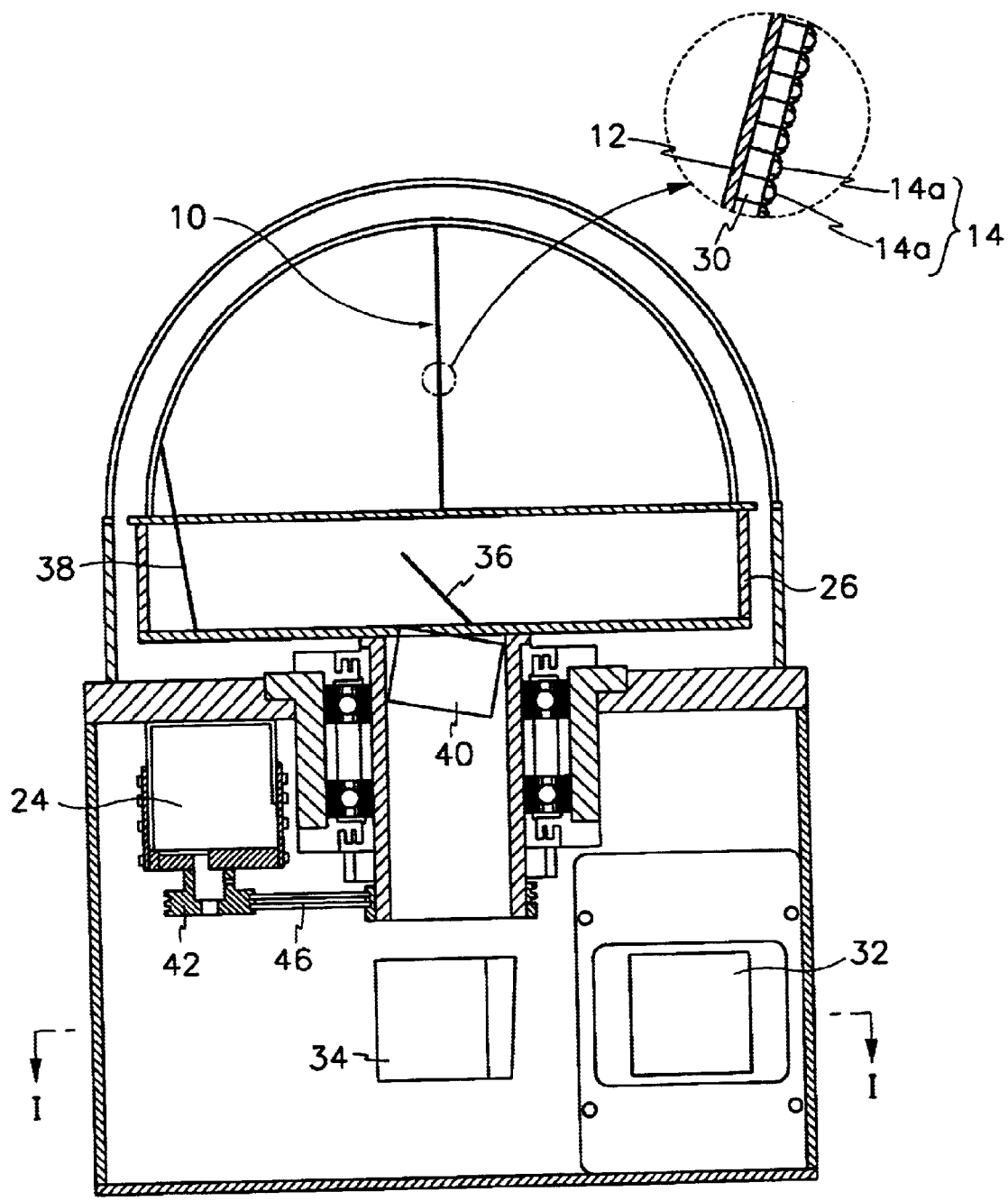
FIG. 3 is a schematic view of a projection display system according to an embodiment of the present invention.
Figure 4:
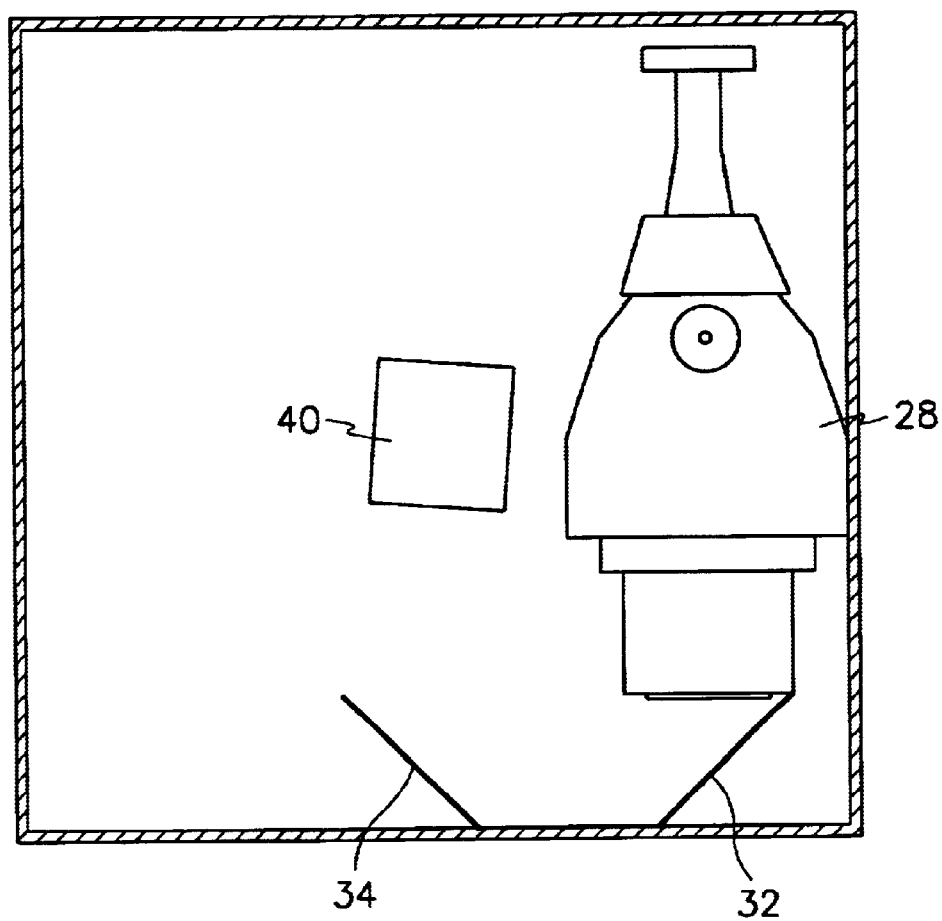
FIG. 4 is a sectional view taken along line I—I of FIG. 3.

FIGS. 3 and 4 show a projection display system where a screen of the present invention is employed. The system is a screen-rotational type.

Screen 10 is mounted on rotational frame 26 that is rotated by motor 24. When the image generated in projector 28, such as a CRT, is projected to the screen rotated by motor 24, the three-dimensional image is realized. Reference numerals 30, 32, 34, 36, and 38 indicates mirrors. Reference numerals 40, 42, and 46 respectively indicate a lens assembly, pulleys, and a belt.

To provide a good three-dimensional image to the user regardless of the location of the user, a sufficient viewing angle in all directions of the screen is needed. In addition, since the user watches only the light going out from the display surface of the screen, the light going out from the opposite surface of the display surface should not be directed to the user. Considering this, the light going out from the opposite surface should be interrupted according to the location of the user.

Therefore, an optical shutter for adjusting the amount of light transmission of pixel lenses 14a according to an image signal is disposed between Fresnel lens 12 and Lenticular lens 14.

The optical shutter 30 is designed to On/Off-control pixel lenses 14a in response to the image signal so that the light can selectively go through the display surface of screen 10. Although an FLCD is preferable as optical shutter 30, there is no need to limit the shutter to the FLCD.

As screen 10 is designed to provide an enlarged viewing angle in the horizontal and vertical directions and shutter 30 prevents the light of the opposite surface from being directed to the user, the projection display system of the present invention can provide an improved image regardless of the location of the user.

While the present invention has been described in connection with particular embodiments, it is to be understood that the invention is not limited to the disclosed embodiments, but, on the contrary, is intended to cover various modifications and equivalent arrangements included within the spirit and scope of the appended claims.

What is claimed is:

1. A screen for a projection display system, comprising:
   a Fresnel lens for converting incoming light into parallel light; and
   a Lenticular lens disposed on a surface of the Fresnel lens to change a path of the parallel light from the Fresnel lens, providing a three-dimensional image to a user;
   wherein the Lenticular lens includes a plurality of pixel lenses corresponding to pixels of the screen, each of the pixel lenses having a central diffusing portion formed on a light-outgoing portion and a peripheral diffusing portion formed on a peripheral portion of the central diffusing portion.

2. The screen of claim 1, wherein a sectional shape of the pixel lenses with respect to horizontal and vertical directions of the screen is radially symmetrical.

3. The screen of claim 2, wherein the central diffusing portion is formed in a hemispherical shape and the peripheral diffusing portion is formed as a wing enclosing the central diffusing portion.

4. The screen of claim 3, wherein:
a distance between a first top of the peripheral diffusing portion and a light-incoming portion of the Lenticular lens is greater than a distance between a second top of the central diffusing portion and the light-incoming portion of the Lenticular lens; and
the first top of the peripheral diffusing portion has a 45° angle between a line normal to the first top and a path of the parallel light coming in to the first top.

5. The screen of claim 1, wherein the pixel lenses are formed of a material having a refractive index of more than √2.

6. A projection display system comprising:
a projector for generating an image; and
a screen for converting the image from the projector into a three-dimensional image,
wherein the screen includes:
a Fresnel lens for converting incoming light into parallel light; and
a Lenticular lens disposed on a surface of the Fresnel lens to change a path of the parallel light from the Fresnel lens and to provide a three-dimensional image to a user, the Lenticular lens including a plurality of pixel lenses corresponding to pixels of the screen, each of the pixel lenses having a central diffusing portion formed on a light-outgoing portion and a peripheral diffusing portion formed on a peripheral portion of the central diffusing portion.

7. The projection display system of claim 6, wherein the screen is rotatable by a motor.

8. The projection display system of claim 7, further comprising an optical shutter for adjusting a light transmission rate in response to an image signal, the shutter being disposed between the Fresnel lens and the Lenticular lens.

9. The projection display system of claim 8, wherein the optical shutter is formed of an ferroelectric liquid crystal display.

10. The projection display system of claim 6, wherein a sectional shape of the pixel lenses with respect to horizontal and vertical directions of the screen is radially symmetrical.

11. The projection display system of claim 10, wherein the central diffusing portion is formed in a hemispherical shape and the peripheral diffusing portion is formed as a wing enclosing the central diffusing portion.

12. The projection display system of claim 11, wherein a distance between a first top of the peripheral diffusing portion and a light-incoming portion of the Lenticular lens is greater than a distance between a second top of the central diffusing portion and the light-incoming portion of the Lenticular lens, and the first top of the peripheral diffusing portion is designed such that when an angle between a line normal to the first top and a path of the parallel light coming in to the first top is $\alpha$, the angle $\alpha$ becomes 45°.

13. The projection display system of claim 6, wherein the pixel lenses are formed of a material having a refractive index of more than √2.

* * * * *